United States Patent [19]

Mueller et al.

[11] Patent Number: 4,706,231
[45] Date of Patent: Nov. 10, 1987

[54] REACTION MASS ACCELERATION FEEDBACK DEVICE

[75] Inventors: Allan H. Mueller, Houston; Dean P. Perkins, Pasadena, both of Tex.

[73] Assignee: Geosource Inc., Houston, Tex.

[21] Appl. No.: 760,321

[22] Filed: Jul. 29, 1985

[51] Int. Cl.$^4$ ............................................ H04R 23/00
[52] U.S. Cl. ................................... 367/190; 181/113; 181/119; 181/121
[58] Field of Search ................ 367/190, 189; 181/113, 181/114, 119, 121

[56] References Cited

U.S. PATENT DOCUMENTS

| | | | |
|---|---|---|---|
| 3,208,550 | 9/1965 | Castanet et al. | 181/0.5 |
| 3,216,525 | 9/1965 | Fail, et al. | 181/0.5 |
| 3,516,510 | 6/1970 | Coburn et al. | 367/190 |
| 4,049,077 | 12/1977 | Mifsud | 181/114 |
| 4,184,144 | 1/1980 | Rickenbacker | 367/137 |

FOREIGN PATENT DOCUMENTS 2043896 10/1980 United Kingdom .

OTHER PUBLICATIONS

Distefano et al., *Theory and Problems of Feedback and Control Systems,* McGraw-Hill, Inc., ®1967, p. 295.

*Primary Examiner*—Charles T. Jordan
*Assistant Examiner*—John W. Eldred
*Attorney, Agent, or Firm*—Arnold, White & Durkee

[57] ABSTRACT

An improvement for the drive control system of a vibratory sound source used in seismic exploration comprising apparatus for generating a feedback signal proportional to the instantaneous acceleration of the reaction mass structure of the sound source's hydraulic drive system. Degenerative feedback of the signal so developed is used to reduce distortion of the vibratory seismic signal imparted into the earth.

14 Claims, 6 Drawing Figures

REACTION MASS ACCELERATION FEEDBACK DEVICE

CROSS REFERENCE TO RELATED APPLICATIONS

Applicants claim the benefit of the filing date of prior application Ser. No. 676,718 filed Nov. 30, 1984.

BACKGROUND OF THE INVENTION

1. Field of the Invention

This invention relates to a novel means for providing improved damping in the control loop of a vibrating sound source used in seismic data acquisition. More particularly, this invention relates to the application of an improved feedback signal developed from the acceleration of the reaction mass in a seismic data acquisition vibrating sound source to the control loop to reduce vibratory seismic signal applied to the earth's surface.

2. Background Art

In seismic exploration, a data acquisition system is employed wherein a sound source is applied to the surface of the earth and sound pickup devices known as geophones are attached to the surface of the earth to pick up resulting echoes from subsurface strata. Recordings of the signals received by these geophones are made and the relative positions of the echoes on the respective time axes of the recordings are used to locate the depths of these strata. Information thereby gained is used to locate valuable minerals, principally oil and gas, for subsequent drilling operations.

A principally used sound source is the explosion of dynamite charges. Selection of the force of the explosion and its location relative to the location of the geophone array allow a controlled sound impulse to be directed into the earth so that the resulting echoes will provide the strata location as desired. The danger of injury and property damage from the explosions, as well as the resulting noise pollution, has restricted the use of explosions as a sound source to remote areas. In order to provide a sound source without these deleterious effects, hydraulically driven vibratory sound sources have been developed. The vibratory sound source is usually implemented with a hydraulically-actuated shaker plate mounted under a heavy truck. Hydraulic force is transmitted to the shaker plate by a shaft from a hydraulic piston and cylinder assembly mounted in a heavy reaction mass structure. The shaker plate is lowered to the surface of the earth, and a vibratory signal is thus directed into the earth for subsequent reception by geophones. The vibratory sound source may be used in populated areas without danger of serious injury, property damage or excessive noise pollution.

The hydraulic cylinder and piston assembly generally employs two cylinder chambers, one above the piston and one below the piston. The top and bottom piston faces, generally of substantially equal area, are exposed to pressure from hydraulic fluid introduced into the two chambers. By selecting the chamber which has the greater pressure, the piston may be moved up or down as desired. The magnitude of the net force on the piston is proportional to the pressure differential.

The vibratory sound source replaces the sound impulse of the explosive charge with a swept frequency vibratory signal of several seconds duration. It may be shown that the resulting geophone signals can be conditioned by a filter having a linear frequency vs. delay characteristic so as to produce signals like those resulting from explosive sources. The waveshape of the transmitted vibratory signal applied to the surface of the earth must be precisely controlled so as to reduce distortion of the received signals and allow correct matching of the conditioning filter to the transmitted signal. Adequate control of the large mass shaker plate and associated hydraulic driving mechanism requires properly tailored feedback loops in the shaker plate drive control system.

Much work in the art of vibratory sound has been done in developing relevant feedback signals, conditioning the feedback signals and applying the conditioned feedback signals to the shaker plate drive mechanism so as to improve performance. One such effort is that taught in U.S. Pat. No. 3,216,525 issued to Fail et al. A technique known as Force Control, as exemplified in U.S. Pat. No. 4,184,144, uses a feedback signal proportional to the force actually applied to the surface of the earth by the shaker plate developed from other measurable parameters in the system.

One problem encountered in shaker plate drive control systems is the presence of low frequency resonance peaks in the drive control transfer function. These peaks typically occur in the region of 5 to 50 Hertz. The resonance peaks result from a combination of the natural modes of resonance of the shaker plate and its associated large mass drive system, and resonant effects caused by rock strata located near the point on the earth's surface where the shaker plate is applied. Excessive resonance can cause the shaker plate to decouple, that is, rise slightly from the earth's surface when vibrating. This results in distortion of the sound signal actually imparted into the earth.

SUMMARY OF THE INVENTION

The present invention teaches an improved system for controlling the application of hydraulic power to the shaker plate which applies the swept frequency vibratory sound signal to the surface of the earth. More specifically, a signal proportional to the acceleration of the reaction mass structure is filtered and conditioned. The resulting signal is degeneratively fed back into the control system's summing junction along with other feedback signals which may be already present in the control system.

Pressure developed in the hydraulic cylinder causes equal and opposite forces to be exerted upon the reaction mass structure and the shaker plate. So long as decoupling does not occur, the force applied by the shaker plate to the ground as a result of the hydraulic pressure is then equal to and opposite to the force applied to the reaction mass structure. The force actually applied to the earth's surface by the shaker plate has an additional component, viewed for the purposes of this analysis to be constant, which is caused by the weight of the vehicle which carries the vibrating sound source. In actual operation, the reaction mass structure and shaker plate are lowered to the earth's surface so as to lift the rear wheels of the vehicle off the ground.

The force applied to the reaction mass structure is equal to the area of a piston face multiplied by the hydraulic cylinder pressure differential. The force applied to the reaction mass structure is also equal to the mass of the reaction mass structure multiplied by the instantaneous acceleration of the reaction mass structure. The acceleration of the reaction mass structure is therefore proportional to the hydraulic pressure differential. The acceleration of the reaction mass structure is also proportional to the force applied to the reaction mass structure. As long as decoupling does not occur, the acceleration of the reaction mass structure is thus proportional to the component of the shaker plate ground force derived from the hydraulic pressure.

In the present invention, an accelerometer is mounted on the reaction mass structure and develops an electrical signal proportional to the structure's instantaneous acceleration. This signal, suitably filtered and conditioned, is then fed back into the system summing junction. An ideal accelerometer would produce an electrical signal which would be truly proportional to the instantaneous acceleration of the structure upon which it is mounted. That is, the waveshape of the acceleration, expressed as a function of time, would be identical to the waveshape of the accelerometer's electrical output signal, and would differ only by a multiplicative constant. Practical accelerometers actually produce an electrical signal representing the acceleration, but which contain some distortion. This distortion may typically appear as a high frequency ripple signal additively impressed on the component of the electrical output signal proportional to the acceleration. Some filtering is usually necessary to smooth out this extraneous ripple distortion.

The invention may be used to effect one or more of several improvements. The nature of the improvement will depend on the type of conditioning and filtering performed on the accelerometer signal so fed back. For example, selecting a broad band filter which provides some gain for the signals in its passband will permit tighter control of the hydraulic cylinder differential pressure. The filter is "broad band" in that it has a gain which is substantially uniform over the range of usable seismic frequencies. With current seismic techniques, this range extends from 0 Hertz to about 500 Hertz. Since, as previously described, the reaction mass structure acceleration is proportional to differential pressure, a feedback control system like that disclosed by Fail, et al., in U.S. Pat. No. 3,216,525 may be implemented without the necessity of installing pressure sensors in the two hydraulic cylinder chambers.

The previously described problem of low frequency resonance peaks may be removed by the use of this invention. The accelerometer signal is filtered in a low pass filter prior to being fed back. The passband of the filter is selected to include the frequency range in which the resonance peaks occur and to attenuate higher frequencies. Experimentation has shown that these resonance peaks may be reduced by up to 6 decibels by the use of this invention so implemented.

In one embodiment, filtering of the accelerometer output signal is accomplished by a passive electrical filtering network comprised of a combination of resistors, capacitors and conductors but providing no amplification in the process of filtering.

In another embodiment, filtering of the accelerometer output signal may be accomplished by an active electrical filtering network having an amplifier, thus allowing some positive gain within the filter's pass band.

In still another embodiment, the accelerometer used is of the piezoelectric type employing a crystal material capable of producing an electrical signal when the crystal is deformed by acceleration. In such an embodiment, additional filtering is used in the feedback path to perform a smoothing of the accelerometer output signal so as to remove high frequency ripple signals additionally produced by the piezoelectric operation of the accelerometer.

BRIEF DESCRIPTION OF THE DRAWINGS

The following description of a preferred embodiment of the invention may be better understood when read in conjunction with the accompanying drawings, wherein.

DESCRIPTION OF THE PREFERRED EMBODIMENT

Figure 1:
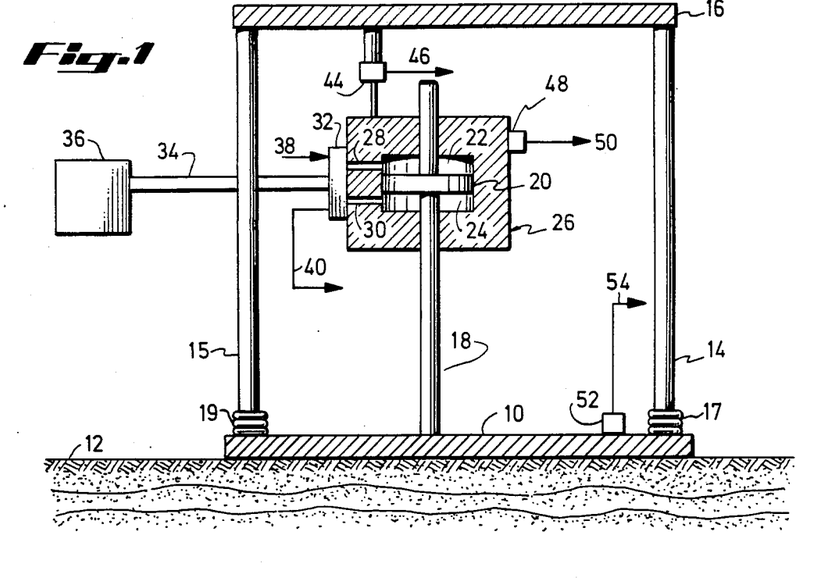
FIG. 1 is a schematic drawing of a vibratory sound source showing the shaker plate mechanism, together with the hydraulic drive mechanism shown in cross-section plus certain aspects of the control mechanism.

Referring now to FIG. 1, a detail of the shaker plate and associated hydraulic drive mechanism may be seen. A shaker plate 10 is shown lowered to the ground surface 12 so as to transmit the required seismic signal into the earth. The shaker plate 10 is suspended from a mounting platform 16 by support legs 14 and 15. In the typical configuration, the mounting platform 16 is made a part of a heavy seismic exploration truck used to move the shaker plate 10 from place to place on the earth's surface for the application of the seismic signal. The support legs 14 and 15 are connected through airbag springs 17 and 19 to shaker plate 10.

A vibratory force is transmitted to the shaker plate 10 by a shaft 18 which is rigidly connected to a hydraulic piston 20. Hydraulic pressure is applied to the piston 20 by hydraulic fluid in chambers 22 and 24 inside reaction mass structure 26. Hydraulic fluid under pressure in vessel 36 is supplied through conduit 34 to control valve 32, thence through orifices 28 and 30, into chambers 22 and 24, respectively. Control valve 32, actuated electrically by control valve signal 38 controls the hydraulic pressure in chambers 22 and 24. The difference between the hydraulic pressure in chamber 22 and the hydraulic pressure in chamber 24 determines the force applied at any instant to the earth's surface 12 by shaker plate 10.

Several electrical signals are developed in the structure of FIG. 1 to effectuate control of the control valve 32. Valve position signal 40 electrically represents the position of the flow control mechanism of control valve 32, thus representing the relative amounts of hydraulic fluid transferred to chambers 22 and 24 and hence the pressure differential between the chambers. A position sensor 44 measures the displacement of the reaction mass structure 26 from the mounting platform 16 and creates a reaction mass structure displacement signal 46 which electrically represents the reaction mass structure displacement. A first accelerometer 48 rigidly mounted upon the reaction mass structure 26 generates a reaction mass structure acceleration signal 50 which electrically represents the reaction mass structure acceleration. A second accelerometer 52 rigidly mounted on the shaker plate 10 generates a shaker plate acceleration signal 54 which electrically represents the shaker plate acceleration.

Accelerometers 48 and 52 are devices capable of producing an electrical output signal which is an electrical representation of the instantaneous acceleration of the mass upon which the accelerometer is mounted. The theoretically ideal accelerometer would produce an electrical output signal which would be a time function differing from the time function of instantaneous acceleration only by a multiplicative constant. Various practical implementations of the ideal accelerometer differ in the faithfulness with which the accelerometer output signal reproduces the time varying acceleration function. Additional filtering is usually required to remove extraneous signals impressed on the accelerometer output signal due to the particular practical implementation used.

Simple accelerometers have been constructed wherein acceleration is measured by measuring the the displacement of a calibrated mass secured by a spring to the accelerometer housing. More practical implementations currently in use employ a piezoelectric crystal, the deformation of which produces an electrical signal representing the acceleration of the structure upon which the accelerometer is mounted. A preferred piezoelectric accelerometer is the Model 328 manufactured by PCB Piezotronics, Inc.

Figure 2:
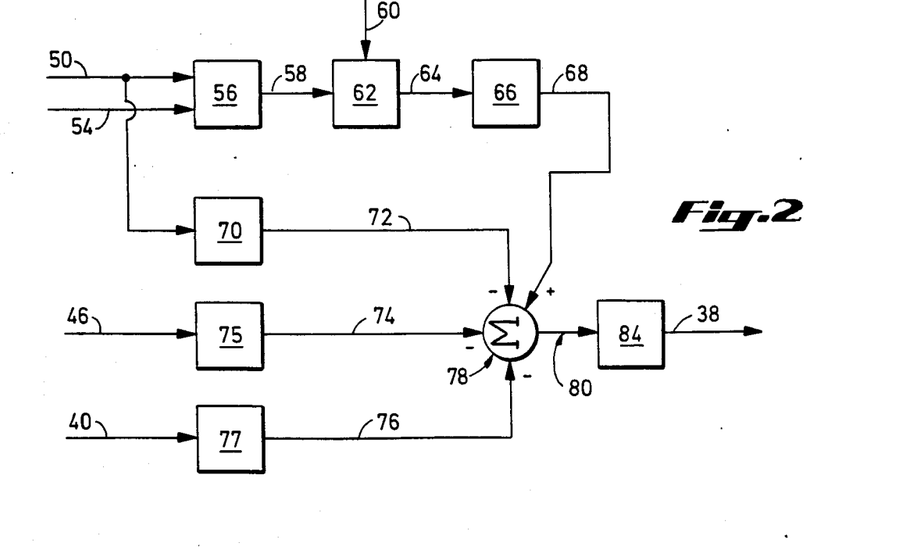
FIG. 2 is a block diagram of the component subsystems used to develop various feedback paths for the control of the shaker plate hydraulic drive mechanism.

Referring now to FIG. 2, the processing of electrical signals developed in the structure of FIG. 1 can be seen. Reaction mass structure acceleration signal 50 and shaker plate acceleration signal 54 are electrically conducted into force signal generator 56. Force signal generator 56 combines signals 50 and 54 to create a measured force signal 58. Measured force signal 58 is then electrically conducted into automatic gain control 62 and combined with the automatic gain control (AGC) reference signal 60 to produce amplitude controlled drive signal 64. The amplitude controlled drive signal 64 is electrically conducted into system response equalizer 66 where it is further conditioned to produced equalized drive control signal 68.

Force signal generator 56 first filters signals 50 and 54 with a low pass filter to remove extraneous noise and ripple impressed upon these signals by the accelerometers 48 and 52 respectively. The filtered signals are then electrically added to form signal 58. In automatic gain control 62, the peak value of the amplitude of signal 58 is detected and is electrically multiplied by the AGC reference signal 60 to produce amplitude line control signal 64. Equalizer 66 comprises a multistage filter which performs frequency equalization on signal 64 to produce signal 68.

Referring further to FIG. 2, the improvement of the present invention may be more particularly seen. A feedback path 70 is implemented wherein reaction mass acceleration signal 50 is processed and filtered so as to produce mass acceleration feedback signal 72. Mass acceleration signal 72 is electrically conducted into summing junction 78 and added with other signals therein so as to produce degenerative feedback in the system.

Reaction mass structure displacement signal 46 is electrically conducted into mass displacement demodulator 75 wherein it is filtered to produce mass displacement feedback signal 74. Valve position signal 40 is electrically conducted into valve displacement demodulator 77 where it is filtered to produce valve displacement feedback signal 76. The filtering action in mass displacement demodulator 75 and valve displacement demodulator 77 serve to smooth the respective input signals upon which they operate and to remove spurious high frequency ripple signals impressed thereon. These high frequency ripple signals are a natural consequence of the electromechanical transducers which respectively generate the reaction mass structure displacement signal 46 and the valve position signal 40 and must be removed from proper system operation.

Equalized drive control signal 68, mass acceleration feedback signal 72, mass displacement feedback signal 74 and valve displacement feedback signal 76 are all electrically conducted into summing junction 78 where the recited signals are additively combined to produce servo input signal 80. Servo input signal 80 is in turn electrically conducted into servo amplifier 84 where it is amplified to produce control valve signal 38 of sufficient amplitude to actuate control valve 32.

Summing junction 78 may be implemented in several ways well known in the electronic art. A preferred implementation would consist of a multiple input electronic amplifier capable of producing an electrical output signal equal to the sum of the instantaneous values of the input signals applied. Inputs supplied with a negative sign are each fed through unity gain amplifiers which invert the signal before summing.

Figure 3:
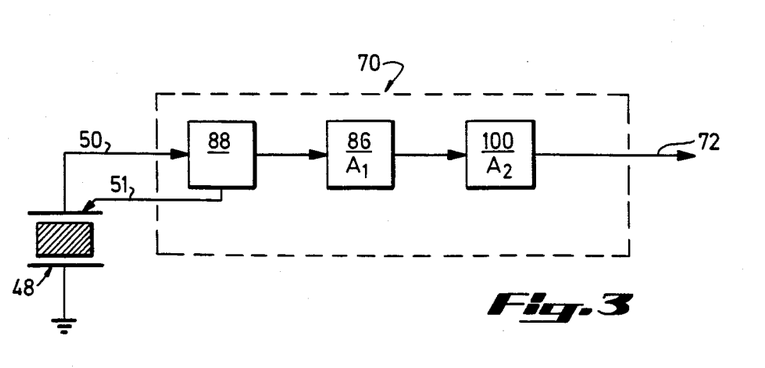
FIG. 3 is a block diagram of an example of a particular implementation of the invention. Shown are filters which may be used to condition the feedback signal developed from the reaction mass structure acceleration.

Referring now to FIG. 3, an example of an implementation of the invention may be seen. Implemented in this fashion, the invention improves control system damping. The overall transfer function of the feedback path 70 is tailored so as to emphasize frequencies in the range where unwanted resonance peaks appear while deemphasizing frequencies in other frequency bands. Thus, when mass acceleration feedback signal 72 is degeneratively fed back and combined with other signals in summing junction 78, relative attenuation will occur in frequency bands in which the unwanted resonance peaks appear.

The feedback produced by feedback path 70 is said to be degenerative in that signals so fed back tend to cancel components of servo input signal 80 resembling the signals so fed back. If reinforcement rather than cancellation were accomplished, the feedback would be said to be regenerative. Degenerative feedback is accomplished by causing the electrical output of feedback path to be electrically conducted into the summing junction 78 with a negative sign.

Figure 4:
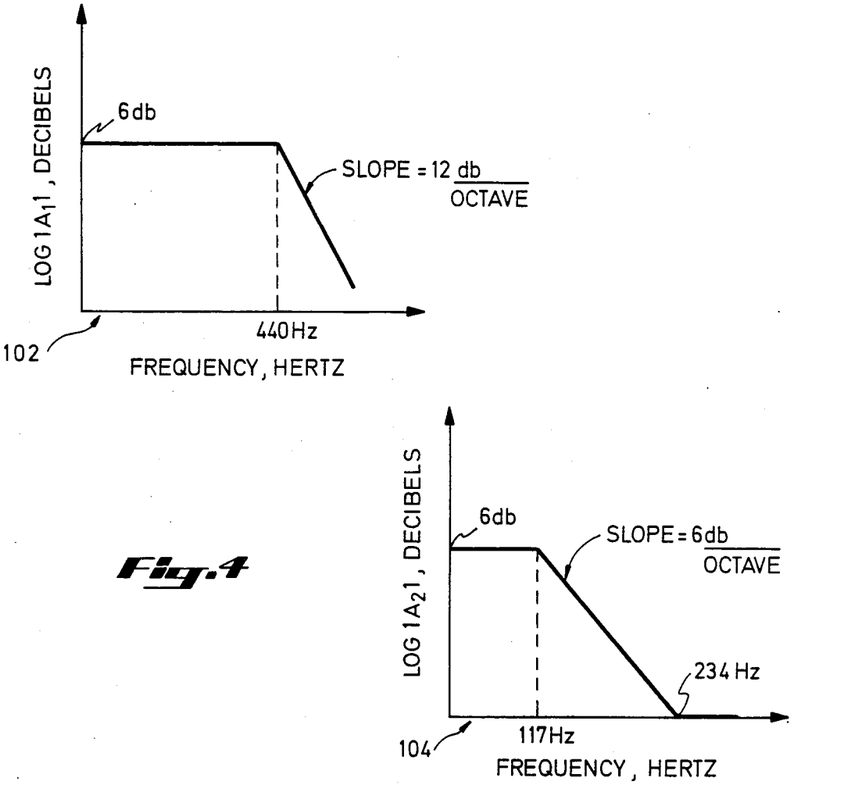
FIG. 4 depicts graphs of transfer functioning of filters used in the example of the invention shown in FIG. 3.

In FIG. 3, a particular example of a suitable feedback path 70 is shown by the cascade arrangement of filter 86, having a transfer function $A_1$, filter 100, having a transfer function $A_2$, and accelerometer signal conditioner 88. Referring to FIG. 4, asymptotic log amplitude vs. log frequency graphs 102 and 104, commonly known in the art as Bode Plots, graphically depict transfer functions $A_1$ and $A_2$, respectively.

The transfer function of an electrical system may be defined as $$A = For[Vout(t)]/For[Vin(t)]$$

where Vout expresses the voltage of the electrical output of the electrical system as a function of time and Vin expresses the voltage of the input signal as a function of time. For [ ] denotes the Fourier transformation of the respective time functions. The absolute value of the complex function A then represents a graph of the gain or loss of the electrical system as a function of frequency. If the absolute value of A, denoted |A|, is expressed in logrithmic units, the overall transfer function of several electrical systems connected in cascade is then the sum of the transfer functions of the individual electrical systems. Two electrical systems are said to be connected in cascade if the output signal of the first electrical system is electrically conducted into the electrical input of the second electrical system. FIG. 3 depicts accelerometer signal conditioner and filters 86 and 100 connected in cascade.

The Bode plots depicted in 102 and 104 are asymptotic log amplitude vs. frequency graphs of a type commonly used to represent transfer functions of electrical systems. These plots, named for the mathematician H. W. Bode, are more particularly described in his book *Network Analysis and Feedback Amplifier Design* published by the D. Van Nostrand Co. of Princeton, New Jersey in 1945. The straight line segments approximate the true transfer function and connect at values of frequency called corner frequencies. These corner frequencies occur at the poles and zeros of the transfer function A. A pole is said to exist at a frequency fp if $$\lim_{f \to fp} |A| = \infty$$

and a zero is said to occur at frequency fz if $$\lim_{f \to fz} A = 0$$

If two poles occur at the same frequency fp, the result is said to be a double pole.

Filter 86 is a double pole electronic filter with corner frequency located at 440 Hz. The two coincident poles of filter 86 result in a negative slope beyond the corner frequency of 12 decibels per octave. Filter 100 has a pole at 117 Hertz and a zero at 234 Hertz. The corresponding response $A_2$ has a negative slope of 6 decibels per octave between 117 Hertz and 234 Hertz. Filter 86 serves to remove spurious high frequency ripple signals impressed upon mass structure acceleration signal 50 by accelerometer 48, and which must be removed for proper system operation. The output signal of filter 86 is essentially a smoothed version of the input signal.

The circuitry used in accelerometer signal conditioner 88 will depend on the specific model of accelerometer used. Accelerometer manufacturers supply information necessary to construct this circuitry along with their respective products. In a typical implementation using piezoelectric accelerometers, accelerometer signal conditioner 88 will supply operating power to accelerometer 48 and will remove the constant D.C. component added to reaction mass acceleration signal 50 by the operation of accelerometer 48. FIG. 3 shows electrical operating power 51 being supplied to accelerometer 48 by a connection separate and distinct from that conducting mass acceleration signal 50. In practical implementations, only one electrical conducting path may be required for the transmission of both electrical operating power 51 and mass acceleration signal 50.

Filters 86 and 100 may be implemented by any electrical network possessing the required transfer function. A preferred implementation uses integrated circuit operational amplifiers with externally connected resistors and capacitors. The filters 86 and 100 are said to be low pass filters, in that their respective pass bands encompass the lower portion of the frequency spectrum. The pass band is that portion of the frequency spectrum passed, or left relatively less attenuated, by the filter.

Figure 5:
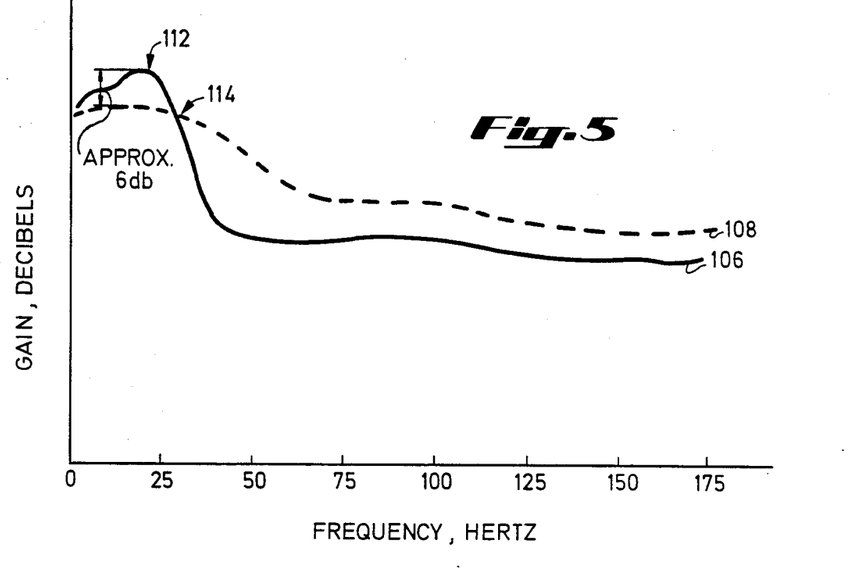
FIG. 5 is a graphical representation of the improvement of the system transfer function effected by the application of damping feedback of the type developed by means of the invention disclosed herein.

Referring now to FIG. 5, an example of the improvement effected by the invention as implemented in Example 1. Depicted are experimentally derived plots 106 and 108 of the system transfer function T, where $$T = For[Fo(t)], For[R(t)]$$

where Fo(t)=time varying force applied to the earth's surface 12 by shaker plate 10
R(t)=AGC reference signal 60 and
For[ ] is the Fourier transform operator.

Figure 6:
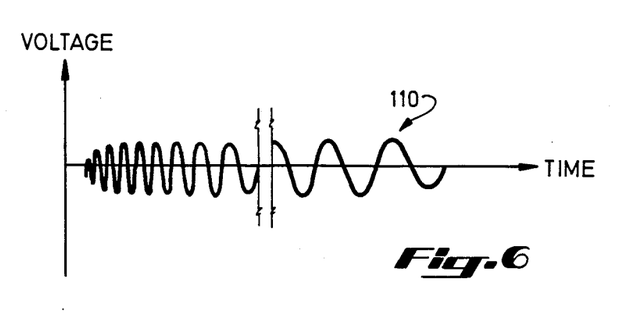
FIG. 6 is a graphical representation of the swept frequency electrical signal applied to the input of control system for the hydraulically driven shaker plate.

FIG. 6 shows a graphical depiction 110 of the AGC reference signal 60 expressed as a function of time which represents the idealized swept frequency vibratory sound signal which must be transmitted into the earth. This signal is substantially a sine wave with its frequency gradually reduced from some predetermined value down to zero. In some applications, swept frequency signals have been used wherein the frequency was increased from zero to a predetermined value during the duration of the signal. Perfect system performance would be achieved if T were a function constant with frequency, resulting in Fo(t) differing from R(t) only by a multiplicative constant. Then apart from amplitude the respective waveshapes of R(t) and Fo(t) would be identical.

Plot 106 in FIG. 5 depicts the experimentally derived value of T as a function of frequency with feedback path 70 removed from the system block diagram of FIG. 2, thus eliminating mass acceleration feedback signal 72 from introduction into the summing junction 78. A resonance peak 112 may be seen to occur at approximately 25 Hertz. Introduction of the feedback path 70 with resulting application of the mass acceleration signal 72 alters the transfer function T to conform to the plot 108 and effects a 6 decibels reduction in the undesired resonance peak 112 to a reduced resonance peak 114.

The foregoing description of the invention has been directed to a particular preferred embodiment in accordance with the requirements of the patent statute and for purposes of explanation and illustration. It will be apparent, however, to those skilled in this art that many modifications and changes in the embodiments described and illustrated herein may be made without departing from the spirit of the invention.

The following claims are intended to cover such modifications and variations as fall within the true spirit and scope of the invention.

We claim:

1. In a vibratory seismic sound source having a shaker plate for applying a swept frequency vibratory sound signal to the surface of the earth, a hydraulic piston housed within a reaction mass structure and connected by a shaft to the shaker plate to transmit an oscillatory hydraulic force developed upon the piston to the shaker plate, and an electrohydraulic control system for driving the hydraulic piston responsive to an input swept frequency electrical signal so as to cause the shaker plate to be shaken in a swept frequency vibratory manner, a feedback system comprising:
  (a) an accelerometer rigidly mounted upon the reaction mass structure and capable of producing an electrical output signal proportional to the instantaneous acceleration of the reaction mass structure;
  (b) an electronic filter adapted to receive and filter the electrical output signal of the accelerometer to produce a feedback signal; and
  (c) a summing junction adapted to degeneratively combine the feedback signal with the input swept frequency electrical signal so as to produce degenerative feedback to the electrohydraulic control system.

2. The feedback system recited in claim 1, wherein the electronic filter provides a gain which is substantially uniform over the entire range of usable seismic frequencies.

3. The feedback system recited in claim 1, wherein the electronic filter has relatively less attenuation in frequency bands in which unwanted system resonance peaks occur and relatively greater attenuation in other frequency bands.

4. The feedback system recited in claim 1, wherein the electronic filter is a low pass filter having a pass band which includes those frequency bands in which unwanted system resonant peaks are found.

5. The feedback system recited in claim 4, wherein the transfer function of the low pass filter has a single pole located at corner frequency $F_1$, a zero at corner frequency $F_2$ and a double pole at corner frequency $F_3$, the magnitude of these corner frequencies satisfying the relation $F_1$ less than $F_2$ less than $F_3$.

6. The feedback system recited in claim 5, wherein $F_1$ is substantially 117 hertz, $F_2$ is substantially 234 hertz and $F_3$ is substantially 440 hertz.

7. In a vibratory seismic sound source having a shaker plate for applying a swept frequency vibratory sound signal to the surface of the earth, a reaction mass structure, a hydraulic piston housed within the reaction mass structure and connected by a shaft to the shaker plate to transmit an oscillatory hydraulic force developed upon the piston to the shaker plate, and an electrohydraulic control system for controlling hydraulic pressure to the hydraulic piston responsive to an input swept frequency electrical signal so as to cause the shaker plate to be shaken in a swept frequency vibratory manner, the electrohydraulic control system employing a multiplicity of feedback paths and a summing junction for electrically adding the swept frequency electrical signal to the electrical outputs of the feedback paths, an improved feedback path comprising:
  (a) a piezoelectric accelerometer rigidly mounted upon the reaction mass structure and producing an acceleration signal representing the instantaneous acceleration of said reaction mass structure;
  (b) an accelerometer signal conditioner for receiving the acceleration signal and producing a conditioned signal substantially equal to the acceleration signal with constant D.C. components removed;
  (c) an accelerometer conditioning filter for receiving the conditioned signal and producing a first filtered signal which is a smoothed version of the acceleration signal;
  (d) an electronic filter for receiving the first filtered signal and producing a second filtered signal; and
  (e) a summing junction to degeneratively combine the second filtered signal with the input swept frequency electrical signal.

8. In the operation of a vibratory seismic sound source for imparting a swept frequency vibratory sound signal into the earth wherein an electrohydraulic control system is employed to control the application of hydraulic pressure to a hydraulic piston in response to a swept frequency electrical signal, the hydraulic piston being housed in a reaction mass structure and connected by a shaft to a shaker plate in contact with the earth's surface, the improved method for developing feedback comprising:
  (a) developing an electrical signal proportional to the instantaneous acceleration of the reaction mass structure; and
  (b) electrically and degeneratively combining the electrical signal of step (a) with the swept frequency electrical signal in a manner so as to produce degenerative feedback to the electrohydraulic control system.

9. The improvement recited in claim 8, wherein the electrical signal proportional to the instantaneous acceleration of the reaction mass structure is developed piezoelectrically.

10. The improvement recited in claim 8, which includes the step of filtering the signal proportional to the instantaneous acceleration of the reaction mass structure to pass a band of frequencies which includes those frequency bands in which unwanted system resonance peaks occur in the operation of the vibratory seismic sound source.

11. The improvement recited in claim 10, wherein the filter employed has a transfer function having a single pole at corner frequency $F_1$, a zero at corner frequency $F_2$ and a double pole at frequency $F_3$, and the magnitude of the corner frequencies satisfies the relation $F_1$ less than $F_2$ less than $F_3$.

12. The improvement recited in claim 11, wherein $F_1$ is substantially 117 Hertz, $F_2$ is substantially 234 Hertz and $F_3$ is substantially 440 Hertz.

13. In a system for imparting a swept frequency vibratory sound signal into the earth wherein an electrohydraulic control system is employed to control the application of hydraulic pressure to a hydraulic piston in response to a swept frequency electrical signal, the hydraulic piston being housed in a reactiom mass structure and connected by a shaft to a shaker plate in contact with the earth's surface, the electrohydraulic control system employing a multiplicity of feedback signals electrically combined with the swept frequency electrical signal, an improved method of developing a feedback signal comprising:
  (a) piezoelectrically developing a first electrical signal representing the instantaneous acceleration of the reaction mass;
  (b) removing a constant D.C. component of the first signal to develop a second electrical signal;
  (c) filtering the second signal to attenuate signal components having frequencies greater than about 500 Hertz to produce a first filtered output;
  (d) filtering the first filtered output to develop a second filtered output wherein signal components having frequencies between about 0 Hertz and about 234 Hertz are amplified; and
  (e) electrically and degeneratively combining the second filtered output with the swept frequency electrical signal so as to produce degenerative feedback to the electrohydraulic control system.

14. The feedback path recited in claim 7,
wherein the accelerometer conditioning filter substantially attenuates signal components of the conditioned signal having frequencies greater than about 500 Hertz to produce a first filtered signal which is dominated by components having frequencies between about 0 Hertz and about 500 Hertz, and wherein the electronic filter amplifies components of the first filtered signal having frequencies between about 0 Hertz and about 234 Hertz to produce the second filtered signal.

* * * * *

UNITED STATES PATENT AND TRADEMARK OFFICE
CERTIFICATE OF CORRECTION

PATENT NO. : 4,706,231
DATED : November 10, 1987
INVENTOR(S) : Mueller, et al.

It is certified that error appears in the above-identified patent and that said Letters Patent are hereby corrected as shown below:

Col. 5, lines 25-26, "the the displacement" should read --the displacement--.

Col. 5, line 59, after "68", please add --A more complete description of a suitable feedback path comprising a force signal generator, an automatic gain control, and a system response equalizer is contained in co-pending U.S. Patent Application Serial No. 676,718, filed November 30, 1984.--

Col. 8, line 12, between "example" and "of" please insert --is shown--.

Col. 8, line 17, "T=For[Fo(t)],For[R(t)]" should read --T=For[Fo(t)],/For[R(t)]--.

Col. 10, line 48, "reactiom" should be --reaction--.

Signed and Sealed this

Fifth Day of July, 1988

Attest:

DONALD J. QUIGG

*Attesting Officer*   *Commissioner of Patents and Trademarks*